United States Patent
Hwang et al.

(10) Patent No.: US 7,553,057 B2
(45) Date of Patent: Jun. 30, 2009

(54) DISPLAY DEVICE AND BACKLIGHT UNIT FOR THE SAME

(75) Inventors: Jae-Ho Hwang, Daegu (KR); Seung-Hoon Yang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 23 days.

(21) Appl. No.: 11/289,408

(22) Filed: Nov. 30, 2005

(65) Prior Publication Data

US 2006/0256581 A1 Nov. 16, 2006

(30) Foreign Application Priority Data

May 10, 2005 (KR) .................. 10-2005-0039029

(51) Int. Cl.
G02B 6/26 (2006.01)
(52) U.S. Cl. .................. 362/607; 362/330; 362/331; 362/339
(58) Field of Classification Search ............ 362/26, 362/600–634
See application file for complete search history.

(56) References Cited

U.S. PATENT DOCUMENTS

| 6,108,060 | A * | 8/2000 | Funamoto et al. ............. 349/65 |
| 6,290,364 | B1 * | 9/2001 | Koike et al. .................. 362/620 |
| 6,364,497 | B1 * | 4/2002 | Park et al. ................... 362/627 |
| 7,147,357 | B2 * | 12/2006 | Kim et al. ................... 362/608 |
| 7,178,964 | B2 * | 2/2007 | Sugiura et al. .............. 362/616 |
| 2002/0105793 | A1 * | 8/2002 | Oda et al. .................... 362/31 |

\* cited by examiner

*Primary Examiner*—Anabel M Ton
(74) *Attorney, Agent, or Firm*—Morgan Lewis & Bockius LLP (57) ABSTRACT

A backlight unit for a display device includes a light guide plate formed with a first prism pattern on one of top and bottom surfaces, a lamp including first and second lamp portions facing first and second side surfaces, respectively, of the light guide plate, and a reflector facing the bottom surface of the light guide plate, wherein the first prism pattern is formed in a direction of crossing at least one of the first and second lamp portions.

23 Claims, 5 Drawing Sheets

FIG. 6 ved as display devices. Presently, much effort has been made
DISPLAY DEVICE AND BACKLIGHT UNIT FOR THE SAME The present invention claims the benefit of Korean Patent Application No. 2005-0039029, filed in Korea on May 10, 2005, which is hereby incorporated by reference.

BACKGROUND OF THE INVENTION

1. Field of the Invention

The present invention relates to a display device, and more particularly, to a backlight unit for the display device.

2. Discussion of the Related Art

Until recently, cathode-ray tubes (CRTs) have been utilized as display devices. Presently, much effort has been made to study and develop various types of flat panel displays, such as liquid crystal display (LCD) devices, plasma display panels (PDPs), field emission displays, and electro-luminescence displays (ELDs), as substitutes for CRTs. Among those flat panel displays, the LCD device has many advantages, such as high resolution, light weight, thin profile, compact size, and low power consumption.

In general, the LCD device includes two substrates that are spaced apart and face each other, and a liquid crystal material interposed between the two substrates. The two substrates are provided with electrodes that face each other such that a voltage applied between the electrodes induces an electric field across the liquid crystal material. In accordance with an intensity of the induced electric field, alignment of liquid crystal molecules in the liquid crystal material changes into a direction of the induced electric field, thereby changing the light transmissivity of the LCD device. Thus, the LCD device displays images by varying the intensity of the induced electric field. Unlike the other types of display devices, the LCD device is a non-luminous display device and cannot display images without a light source (e.g., ambient light or a backlight).

A backlight unit for the LCD device may be either a direct type or an edge type. The direct type backlight unit includes a plurality of lamps directly disposed below a light guide plate and thus emits light to an entire surface of a liquid crystal panel. However, the direct type backlight unit has disadvantages of high power consumption and thick profile. On the other hand, the edge type backlight unit includes a lamp arranged along a side surface of the light guide plate. The lamp for the edge type backlight unit may be a cold cathode fluorescent lamp (CCFL). Accordingly, the edge type backlight unit has advantages of thin profile, low weight and low power consumption. The lamp for the edge type backlight unit may be designed to be a straight shape, an "L" shape or a "U" shape.

Figure 1:
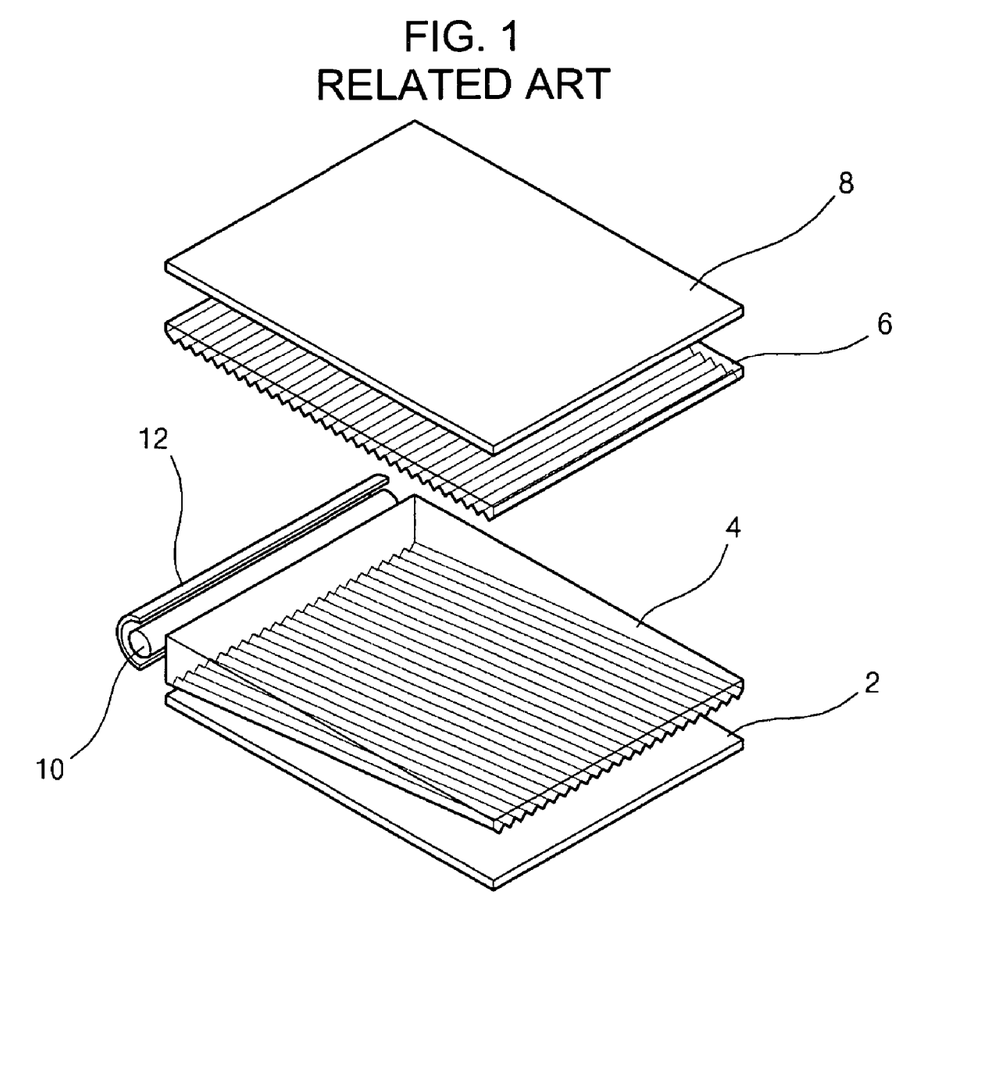
FIG. 1 is an exploded perspective view illustrating an edge type backlight unit for a liquid crystal display device having a straight-shaped lamp according to the related art.

FIG. 1 is an exploded perspective view of an edge type backlight unit for a liquid crystal display device according to the related art. As shown in FIG. 1, the edge type backlight unit includes a straight-shaped lamp 10, a lamp guide 12, a light guide plate 4, a reflector 2, a prism sheet 6 and a diffusion sheet 8. The lamp 10 is disposed along a side surface of the light guide plate 4. The lamp guide 12 covers and protects the lamp 10. The light guide plate 4 transforms a light emitted from the lamp 10 into a plane light. The light guide plate 4 is formed with a first prism pattern on its bottom surface to increase brightness. The prism sheet 6 is disposed on the light guide plate 4 and is formed with a second prism pattern perpendicular to the first prism pattern. The reflector 2 is disposed below the light guide plate 4 and reflects a light toward the light guide plate 4. The diffusion sheet 8 makes an intensity of the light incident thereto uniform.

Figure 2:
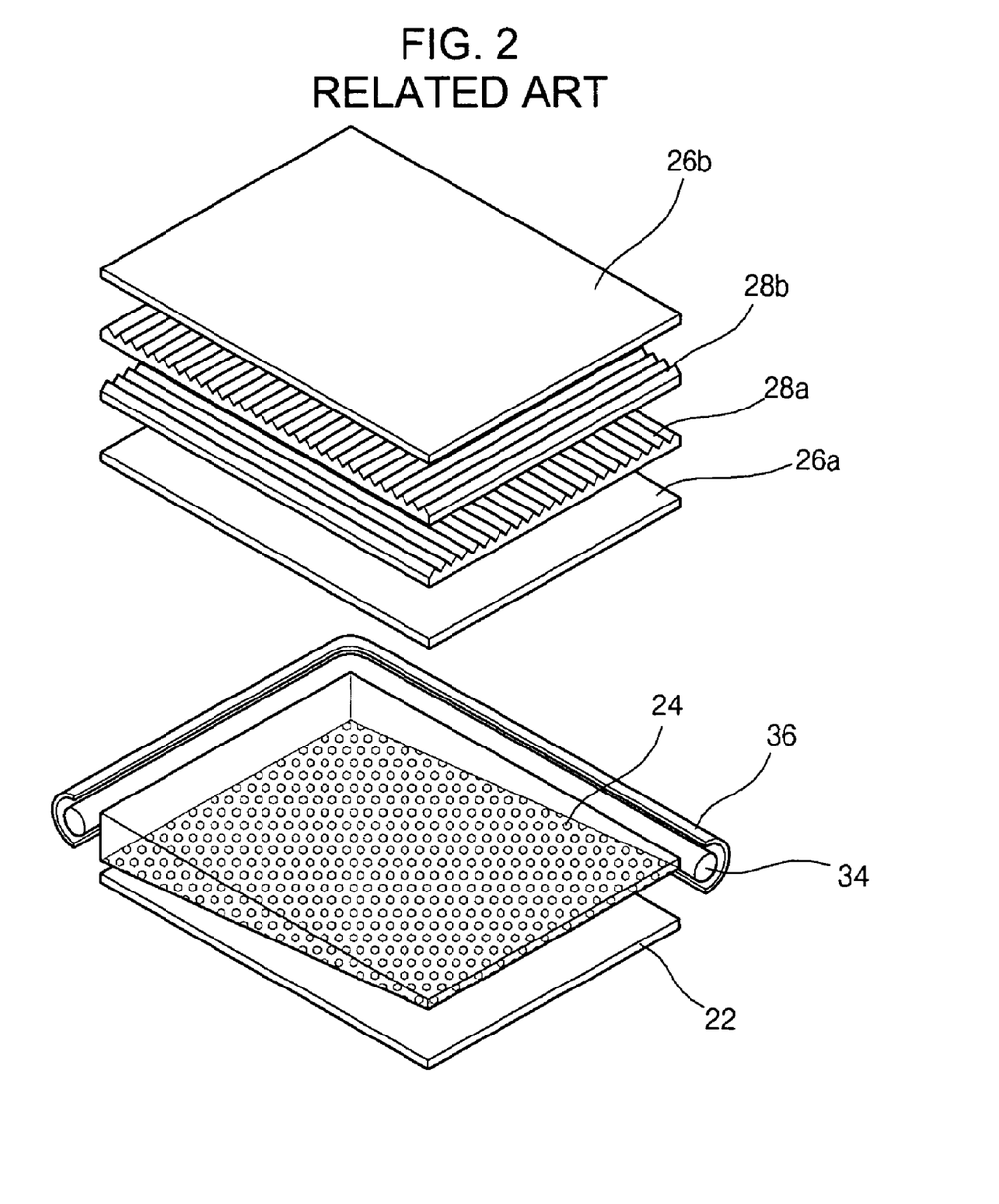
FIG. 2 is an exploded perspective view illustrating another edge type backlight unit for a liquid crystal display device having an L-shaped lamp according to the related art.

FIG. 2 is an exploded perspective view of another edge type backlight unit for a liquid crystal display device having an L-shaped lamp according to the related art. As shown in FIG. 2, the edge type backlight unit includes an L-shaped lamp 34, an L-shaped lamp guide 36, a light guide plate 24, a reflector 22, first and second diffusion sheets 26a and 26b, and first and second prism sheets 28a and 28b.

The L-shaped lamp 34 is disposed along two adjacent side surfaces of the light guide plate 24. The L-shaped lamp guide 36 covers and protects the lamp 34. The light guide plate 24 transforms a light emitted from the lamp 34 into a plane light. The light guide plate 24 is formed with a diffusion pattern on its bottom surface. The diffusion pattern makes the light incident to the light guide plate 24 emitted toward a liquid crystal panel. The first and second diffusion sheets 26a and 26b make an intensity of the light incident thereto uniform. The first and second prism sheets 28a and 28b are formed with first and second prism patterns, respectively, perpendicular to each other. The reflector 22 reflects a light toward the light guide plate 24.

As described above, the backlight unit of FIG. 2 includes the light guide plate 24 having the diffusion pattern, and the two prism sheets 28a and 28b that change light progressive path vertically and concentrate light. Accordingly, the backlight unit of FIG. 2 has a complex structure, which brings about an increase in the number of fabrication processes and fabrication costs. To resolve these problems, the backlight unit of FIG. 2 may utilize the light guide plate (4 of FIG. 1) having the prism pattern of the backlight unit of FIG. 1. However, since the light emitted from a portion of the L-shaped lamp 34 is perpendicular to furrows of the prism pattern of the light guide plate of FIG. 1, part of the light from the portion of the L-shaped is not incident to the light guide plate of FIG. 1 and therefore is wasted. In other words, the portion of the L-shaped lamp 34 parallel to the furrows of the prism pattern of the light guide plate of FIG. 1 emits a light perpendicular to the prism pattern, thereby causing a loss of the part of the light incident to the light guide plate.

Accordingly, when utilizing the light guide plate having the prism pattern instead of the diffusion pattern, the backlight unit of FIG. 2 has light efficiency less than the backlight unit utilizing the diffusion pattern. In addition, an undesirable bright line is generated.

SUMMARY OF THE INVENTION

Accordingly, the present invention is directed to a display device and a backlight unit for the display device that substantially obviate one or more of problems due to limitations and disadvantages of the related art.

An object of the present invention is to provide a display device that is capable of reducing optical sheets in a backlight unit, thereby reducing the fabrication costs.

Another object of the present invention is to provide a backlight unit for the display device that is capable of reducing optical sheets therein, thereby reducing the fabrication costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit for a display device includes a light guide plate formed with a first prism pattern on one of top and bottom surfaces, a lamp including first and second lamp portions facing first and second side surfaces, respectively, of the light guide plate, and a reflector facing the bottom surface of the light guide plate, wherein the first prism pattern is formed in a direction of crossing at least one of the first and second lamp portions.

In another aspect, a display device includes a display panel, a light guide plate facing the display panel and formed with a first prism pattern on one of top and bottom surfaces, a lamp including first and second lamp portions facing first and second side surfaces, respectively, of the light guide plate, and a reflector facing the bottom surface of the light guide plate, wherein the first prism pattern is formed in a direction of crossing at least one of the first and second lamp portions.

Still in another aspect, a backlight unit for a display device includes a light guide plate including a first prism pattern on one of top and bottom surfaces, a lamp including at least a first lamp portion and a second lamp portion that face first and second side surfaces of the light guide plate, respectively, and a reflector facing the bottom surface of the light guide plate, wherein the first prism pattern includes a plurality of furrows formed along a direction of a certain angle with respect to at least one of the first and second lamp portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, which are illustrated in the accompanying drawings.

Figure 3:
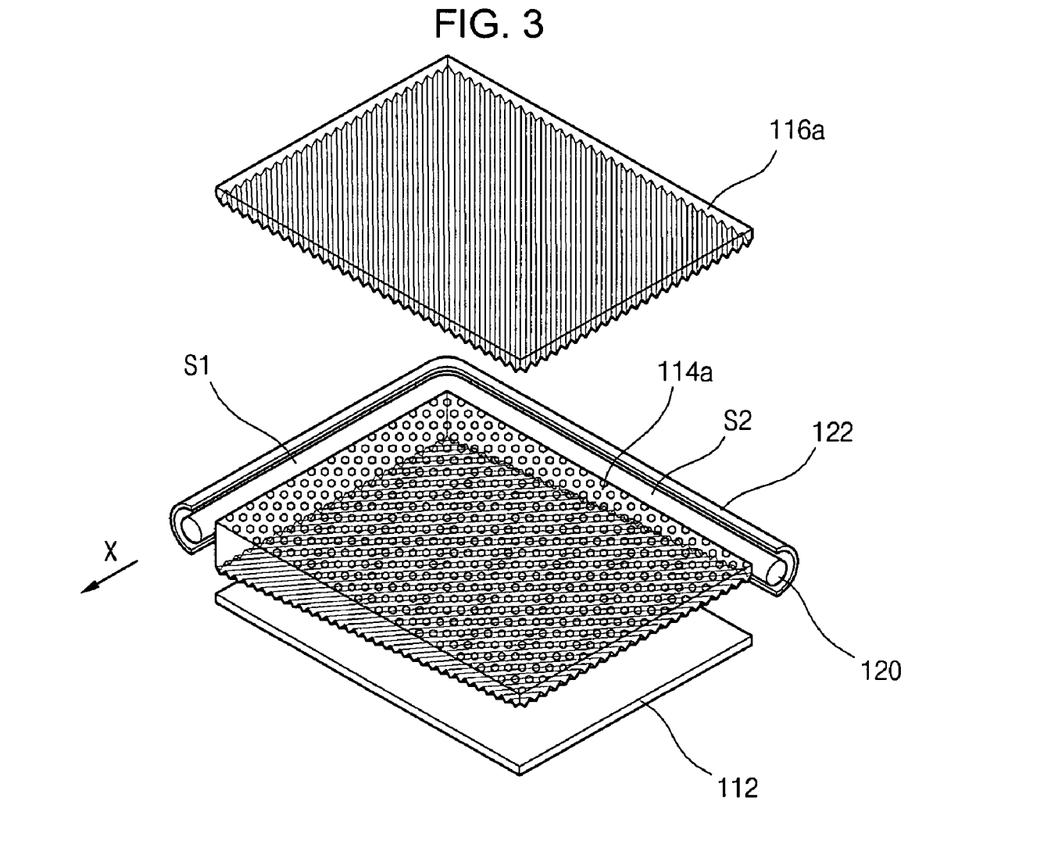
FIG. 3 is an exploded perspective view illustrating an edge type backlight unit for a liquid crystal display device having an L-shaped lamp according to one exemplary embodiment of the present invention.

FIG. 3 is an exploded perspective view illustrating an edge type backlight unit for a liquid crystal display device having an L-shaped lamp according to one exemplary embodiment of the present invention. As shown in FIG. 3, the edge type backlight unit includes an L-shaped lamp 120, an L-shaped lamp guide 122, a light guide plate 114a, a reflector 112, and a prism sheet 116a. The backlight unit is disposed below a liquid crystal panel (not shown) to supply light.

The L-shaped lamp 120 is disposed along two adjacent side surfaces of the light guide plate 114a. The L-shaped lamp 120 includes first and second straight portions "S1" and "S2" facing the two adjacent side surfaces of the light guide plate 114a. The L-shaped lamp guide 122 covers and protects the L-shaped lamp 120 such that the L-shaped lamp guide 122 covers at least top, bottom and outer side portions of the L-shaped lamp 120. Also, the L-shaped lamp guide 122 reflects a light emitted thereto and concentrates a light emitted from the L-shaped lamp 120 toward the light guide plate 114a.

The light guide plate 114a transforms the light emitted from the L-shaped lamp 120 into a plane light. The light guide plate 114a is formed with a diffusion pattern on its top surface and with a first prism pattern on its bottom surface. The first prism pattern includes a plurality of furrows along a direction of a 135° angle with respect to the first straight portion "S1" when the first straight portion "S1" is an x-axis. In addition, the plurality of furrows of the first prism pattern may have a 45° angle with respect to the first straight portion "S1". The diffusion pattern includes a plurality of dots.

The first and second straight portions "S1" and "S2" of the L-shaped lamp 120 emit light toward the two adjacent side surfaces of the light guide plate 114a. The light incident into the light guide plate 114a through the two adjacent side surfaces uniformly spreads in the entire light guide plate 114a by the first prism pattern and is concentrated toward the liquid crystal panel (not shown). Also, the first prism pattern controls the light progressive path and increases brightness. The light concentrated by the first prism pattern has a uniform intensity by passing through the diffusion pattern.

The prism sheet 116a is disposed on the light guide plate 114a and is formed with a second prism pattern on its bottom surface. The second prism pattern includes a plurality of furrows perpendicular to the plurality of farrows of the first prism pattern. The light emitted from the light guide plate 114a is more concentrated toward the liquid crystal panel. The prism sheet 116a may not be employed for the backlight unit of this exemplary embodiment. The reflector 112 is disposed below the light guide plate 114a and reflects a light toward the light guide plate 114a.

Figure 4:
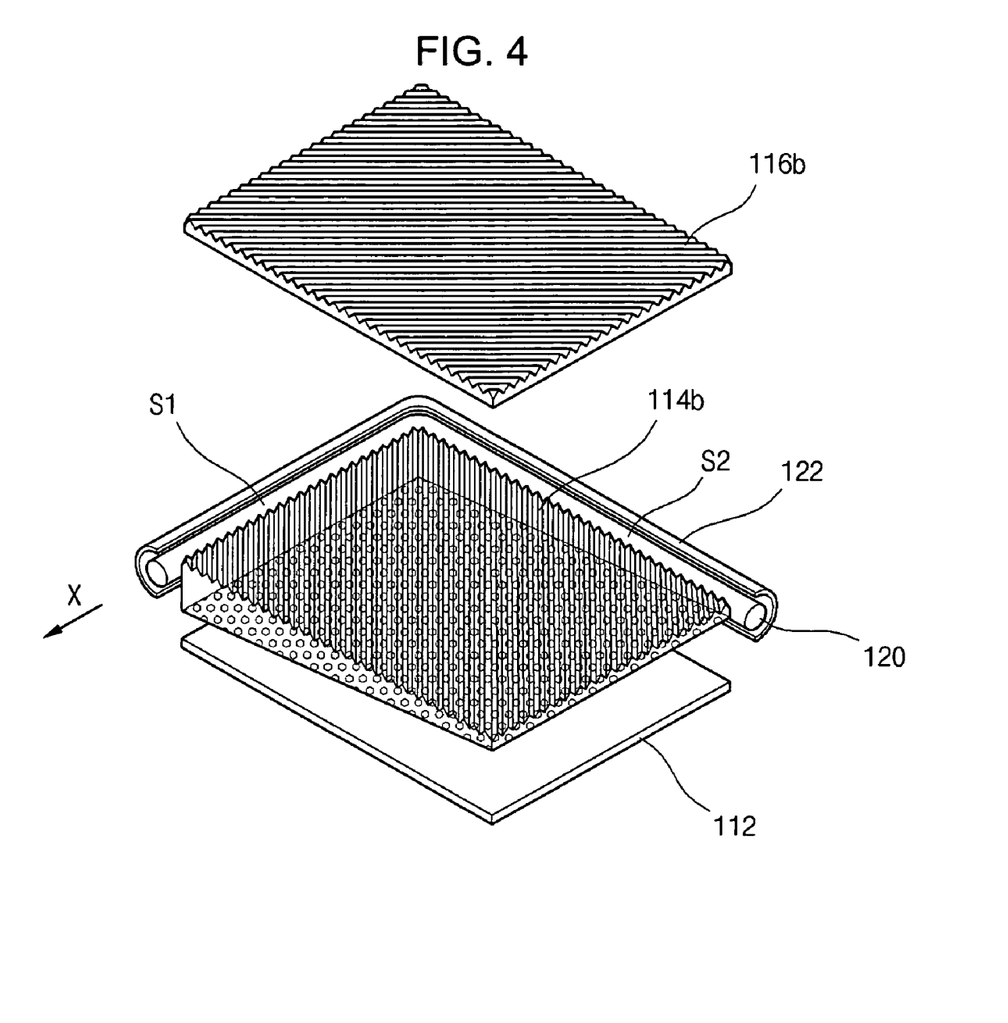
FIG. 4 is an exploded perspective view illustrating an edge type backlight unit for a liquid crystal display device having an L-shaped lamp according to another exemplary embodiment of the present invention.

FIG. 4 is an exploded perspective view illustrating an edge type backlight unit for a liquid crystal display device having an L-shaped lamp according to another exemplary embodiment of the present invention. The backlight unit of FIG. 4 has a similar structure to the backlight unit of FIG. 3, except for positions of the first and second prism patterns and the diffusion pattern. As shown in FIG. 4, the edge type backlight unit includes an L-shaped lamp 120, an L-shaped lamp guide 122, a light guide plate 114b, a reflector 112, and a prism sheet 116b.

The L-shaped lamp 120 is disposed along two adjacent side surfaces of the light guide plate 114b. The L-shaped lamp 120 includes first and second straight portions "S1" and "S2" facing the two adjacent side surfaces of the light guide plate 114b. The L-shaped lamp guide 122 covers and protects the L-shaped lamp 120 such that the L-shaped lamp guide 122 covers at least top, bottom and outer side portions of the L-shaped lamp 120. Also, the L-shaped lamp guide 122 reflects a light emitted thereto and concentrates a light emitted from the L-shaped lamp 120 toward the light guide plate 114b.

The light guide plate 114b transforms the light emitted from the L-shaped lamp 120 into a plane light. Unlike the light guide plate 114a of FIG. 3, the light guide plate 114b is formed with a diffusion pattern on its bottom surface and a first prism pattern on its top surface. The first prism pattern of the light guide plate 114b includes a plurality of furrows along a direction of a 45° angle with respect to the first straight portion "S1" when the first straight portion "S1" is an x-axis. In addition, the plurality of furrow of the first prism pattern may have a 135° angle with respect to the first straight portion "S1". The diffusion pattern includes a plurality of dots.

The first and second straight portions "S1" and "S2" of the L-shaped lamp 120 emit light toward the two adjacent side surfaces. The diffusion pattern makes an intensity of the light incident thereto uniform and changes the light progressive path such that the light incident to the adjacent side surfaces is emitted toward the liquid crystal panel (not shown). The first prism pattern concentrates light toward the liquid crystal panel (not shown) and increases brightness.

The prism sheet 116b is disposed on the light guide plate 114b and is formed with a second prism pattern on a top surface of the prism sheet 116b. The second prism pattern includes a plurality of furrows perpendicular to the plurality of furrows of the first prism pattern. The light emitted from the light guide plate 114b is more concentrated toward the liquid crystal panel (not shown). The prism sheet 116b may not be employed for the backlight unit of this exemplary embodiment in FIG. 4. The reflector 112 is disposed below the light guide plate 114b and reflects a light toward the light guide plate 114b.

Figure 5:
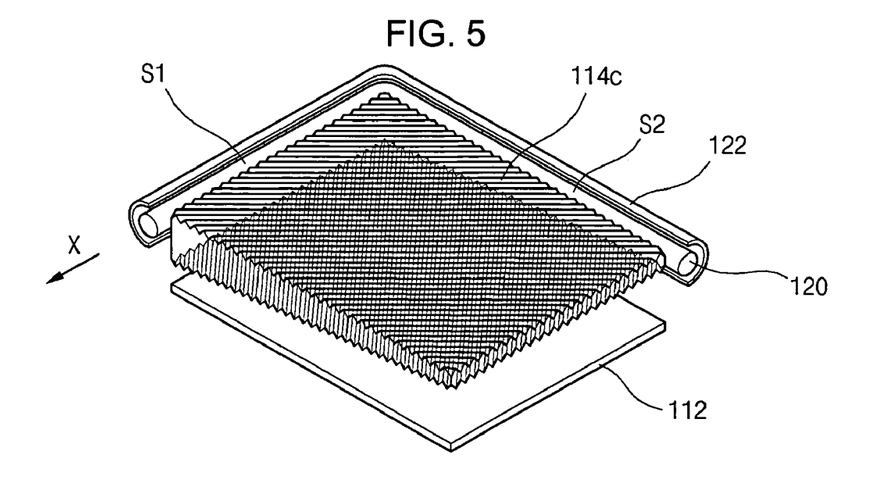
FIG. 5 is an exploded perspective view illustrating an edge type backlight unit for a liquid crystal display device having an L-shaped lamp according to another exemplary embodiment of the present invention.

FIG. 5 is an exploded perspective view illustrating an edge type backlight unit for a liquid crystal display device having an L-shaped lamp according to another exemplary embodiment of the present invention. The backlight unit of this exemplary embodiment is characterized in that a light guide plate is formed with two prism patterns on its top and bottom surfaces. As shown in FIG. 5, the edge type backlight unit includes an L-shaped lamp 120, an L-shaped lamp guide 122, a light guide plate 114c and a reflector 112.

The L-shaped lamp 120 is disposed along two adjacent side surfaces of the light guide plate 114c. The L-shaped lamp 120 includes first and second straight portions "S1" and "S2" facing the two adjacent side surfaces of the light guide plate 114c. The L-shaped lamp guide 122 covers and protects the L-shaped lamp 120 such that the L-shaped lamp guide 122 covers at least top, bottom and outer side portions of the L-shaped lamp 120. Also, the L-shaped lamp guide 122 reflects a light emitted thereto and concentrates a light emitted from the L-shaped lamp 120 toward the light guide plate 114c.

The light guide plate 114c transforms the light emitted from the L-shaped lamp 120 into a plane light. The light guide plate 114c is formed with first and second prism patterns on its top and bottom surfaces, respectively. The first prism pattern includes a plurality of furrows along a direction of a 135° angle with respect to the first straight portion "S1" when the first straight portion "S1" is an x-axis. The second prism pattern includes a plurality of furrows perpendicular to the plurality of furrows of the first prism pattern. In addition, the plurality of furrows of the first and second prism pattern may have the opposite angles.

The light guide plate 114c includes one prism pattern more than the light guide plates (114a of FIG. 3 and 114b of FIG. 4). Moreover, the prism sheets (116a of FIG. 3 and 116b of FIG. 4) and the diffusion patterns of FIGS. 3 and 4 may not be employed in this exemplary embodiment. Although the prism sheets and the diffusion patterns are not utilized in this exemplary embodiment, a light is still efficiently concentrated and diffused because the first and second prism patterns are formed on the top and bottom surfaces of the light guide plate 114c. The reflector 112 is disposed below the light guide plate 114c and reflects a light toward the light guide plate 114c.

Figure 6:
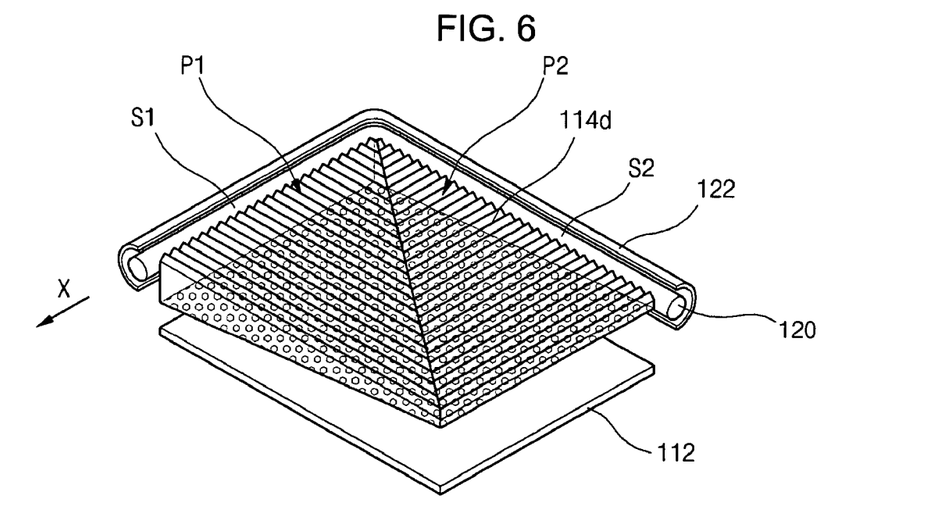
FIG. 6 is an exploded perspective view illustrating an edge type backlight unit for a liquid crystal display device having an L-shaped lamp according to another exemplary embodiment of the present invention.

FIG. 6 is an exploded perspective view illustrating an edge type backlight unit for a liquid crystal display device having an L-shaped lamp according to another exemplary embodiment of the present invention. The backlight unit of this exemplary embodiment is characterized in that a light guide plate is formed with two prism patterns on its top surface and with a diffusion pattern on its bottom surface.

As shown in FIG. 6, the edge type backlight unit includes an L-shaped lamp 120, an L-shaped lamp guide 122, a light guide plate 114d and a reflector 112. The L-shaped lamp 120 is disposed along two adjacent side surfaces of the light guide plate 114d. The L-shaped lamp 120 includes first and second straight portions "S1" and "S2" facing the two adjacent side surfaces of the light guide plate 114d. The L-shaped lamp guide 122 covers and protects the L-shaped lamp 120 such that the L-shaped lamp guide 122 covers at least top, bottom and outer side portions of the L-shaped lamp 120. Also, the L-shaped lamp guide 122 reflects a light emitted thereto and concentrates a light emitted from the L-shaped lamp 120 toward the light guide plate 114d.

The light guide plate 114d transforms the light emitted from the L-shaped lamp 120 into a plane light. The light guide plate 114d is formed with first and second prism patterns "P1" and "P2" on its top surface and with a diffusion pattern on its bottom surface. In other words, while the light guide plate 114d includes two prism patterns similarly to the light guide plate (114c of FIG. 5), the two prism patterns P1 and P2 of the light guide plate 114d are formed on the same surface. When the top surface of the light guide plate 114d is divided into first and second portions with respect to a diagonal line passing through a corner of the L-shaped lamp 120, the first prism pattern "P1" is formed on the first portion and includes a plurality of furrows along a direction of a 90° angle with respect to the first straight portion "S1" and the second prism pattern "P2" is formed on the second portion and includes a plurality of furrows along a direction of a 90° angle with respect to the second straight portion "S1". According to the arrangement of this exemplary embodiment, since the first and second prism patterns "P1" and "P2" are formed perpendicularly to the first and second straight portions "S1" and "S2", respectively, the entire light emitted from the first and second straight portion "S1" and "S2" is incident to the light guide plate 114d.

The diffusion pattern makes an intensity of the light incident thereto uniform and changes the light progressive path such that the light incident to the side surfaces is emitted toward the liquid crystal panel (not shown). The first and second prism patterns "P1" and "P2"concentrate the light toward the liquid crystal panel (not shown) and increases brightness. The reflector 112 is disposed below the light guide plate 114d and reflects a light toward the light guide plate 114d.

As described above, in the backlight unit of the exemplary embodiments, the light guide plate is formed with the prism pattern including the plurality of furrows obliquely or perpendicularly crossing the lamp. Moreover, the backlight unit is formed with the diffusion pattern. Accordingly, the backlight unit utilizes at most one prism sheet. Therefore, optical sheets in the backlight unit of the exemplary embodiments of the present invention can be minimized, thereby reducing the fabrication costs. Also, positions of the prism patterns and the diffusion pattern (dot pattern) are not limited to these exemplary embodiments. For example, the positions of the prism patterns and the diffusion pattern of the light guide plate of FIG. 6 may be changed. In addition, in the exemplary embodiments, the L-shaped lamps are mainly explained. However, it should be understood that the number and the shapes of the lamps are not limited to the exemplary embodiments. For example, two straight type lamps along the adjacent two side surfaces of the light guide plate may be utilized instead of the L-shaped lamp, two L-shaped lamps along four side surfaces of the light guide plate may be utilized, or a U-shaped lamp along three side surfaces of the light guide plate may be utilized. Moreover, the backlight unit may be applicable to other non-luminous type display devices besides the LCD device.

It will be apparent to those skilled in the art that various modifications and variations can be made in the LCD device and the backlight unit for the LCD or other display device of the present invention without departing from the spirit or scope of the invention. Thus, it is intended that the present invention cover the modifications and variations of this invention provided they come within the scope of the appended claims and their equivalents.

What is claimed is:

1. A backlight unit for a display device, comprising:
a light guide plate including a first prism pattern on one of top and bottom surfaces;
a lamp including at least a first lamp portion and a second lamp portion that face first and second side surfaces of the light guide plate, respectively;
a reflector facing the bottom surface of the light guide plate; and
a prism sheet facing the top surface,
wherein the first prism pattern is formed in a oblique direction of crossing at least one of the first and second lamp portions, and
wherein the prism sheet includes a second prism pattern formed in a direction of crossing the first prism pattern.

2. The backlight unit according to claim 1, wherein the light guide plate further includes a diffusion pattern on the other of the top and bottom surfaces.

3. The backlight unit according to claim 2, wherein the first prism pattern has one of 45° and 135° angles with respect to the first lamp portion.

4. A backlight unit for a display device, comprising:
a light guide plate including a first prism pattern on one of top and bottom surfaces;
a lamp including at least a first lamp portion and a second lamp portion that face first and second side surfaces of the light guide plate, respectively; and
a reflector facing the bottom surface of the light guide plate,
wherein the first prism pattern is formed in an oblique direction of crossing at least one of the first and second lamp portions, and
wherein the light guide plate further includes a second prism pattern on the other of the top and bottom surfaces, the second prism pattern formed in a direction of crossing the first prism pattern.

5. The backlight unit according to claim 4, wherein the first prism pattern includes one of 45° and 135° angles with respect to the first lamp portion.

6. A backlight unit for a display device, comprising:
a light guide plate including a first prism pattern on one of top and bottom surfaces;
a lamp including at least a first lamp portion and a second lamp portion that face first and second side surfaces of the light guide plate, respectively; and
a reflector facing the bottom surface of the light guide plate,
wherein the first prism pattern is formed in an oblique direction of crossing at least one of the first and second lamp portions, and
wherein the light guide plate further includes a second prism pattern on the one of the top and bottom surfaces and a diffusion pattern on the other of the top and bottom surfaces.

7. The backlight unit according to claim 6, wherein the first and second prism patterns are disposed in first and second portions of the one of the top and bottom surfaces adjacent to the first and second lamp portions, respectively, the first and second prism patterns perpendicular to the first and second lamp portions, respectively.

8. The backlight unit according to claim 1, wherein the lamp further includes a third lamp portion facing at least one of another two side surfaces of the light guide plate.

9. A display device, comprising:
a display panel;
a light guide plate facing the display panel and including a first prism pattern on one of top and bottom surfaces;
a lamp including at least a first lamp portion and a second lamp portion that face two side surfaces of the light guide plate, respectively;
a reflector facing the bottom surface of the light guide plate; and
a prism sheet facing the top surface,
wherein the first prism pattern is formed in a oblique direction of crossing at least one of the first and second lamp portions, and
wherein the prism sheet includes a second prism pattern formed in a direction of crossing the first prism pattern.

10. The device according to claim 9, wherein the light guide plate further includes a diffusion pattern on the other of the top and bottom surfaces.

11. The device according to claim 10, wherein the first prism pattern includes one of 45° and 135° angles with respect to the first lamp portion.

12. A display device, comprising:
a display panel;
a light guide plate facing the display panel and including a first prism pattern on one of top and bottom surfaces;
a lamp including at least a first lamp portion and a second lamp portion that face two side surfaces of the light guide plate, respectively; and
a reflector facing the bottom surface of the light guide plate,
wherein the first prism pattern is formed in an oblique direction of crossing at least one of the first and second lamp portions, and
wherein the light guide plate further includes a second prism pattern on the other of the top and bottom surfaces, the second prism pattern formed in a direction of crossing the first prism pattern.

13. The device according to claim 12, wherein the first prism pattern includes one of 45° and 135° angles with respect to the first lamp portion.

14. A display device, comprising:
a display panel;
a light guide plate facing the display panel and including a first prism pattern on one of top and bottom surfaces;
a lamp including at least a first lamp portion and a second lamp portion that face two side surfaces of the light guide plate, respectively; and a reflector facing the bottom surface of the light guide plate, wherein the first prism pattern is formed in an oblique direction of crossing at least one of the first and second lamp portions, and wherein the light guide plate further includes a second prism pattern on the one of the top and bottom surfaces and a diffusion pattern on the other of the top and bottom surfaces.

15. The device according to claim 14, wherein the first and second prism patterns are disposed in first and second portions of the one of the top and bottom surfaces adjacent to the first and second lamp portions, respectively, the first and second prism patterns perpendicular to the first and second lamp portions, respectively.

16. The device according to claim 9, wherein the lamp further includes a third lamp portion facing at least one of another two side surfaces of the light guide plate.

17. The device according to claim 9, wherein the display panel includes a liquid crystal panel.

18. A backlight unit for a display device, comprising:

a light guide plate including a first prism pattern on one of top and bottom surfaces;

a lamp including at least a first lamp portion and a second lamp portion that face first and second side surfaces of the light guide plate, respectively; and a reflector facing the bottom surface of the light guide plate, wherein the first prism pattern includes a plurality of furrows formed along an oblique direction with respect to at least one of the first and second lamp portions wherein the light guide plate further includes a second prism pattern on the other of top and bottom surfaces, and wherein the second prism pattern includes a plurality of furrows formed along a second direction of crossing the first direction.

19. A backlight unit for a display device, comprising:

a light guide plate including a first prism pattern on one of top and bottom surfaces;

a lamp including at least a first lamp portion and a second lamp portion that face first and second side surfaces of the light guide plate, respectively; and a reflector facing the bottom surface of the light guide plate, wherein the first prism pattern is formed in an oblique direction of crossing at least one of the first and second lamp portions, wherein the light guide plate further includes a second prism pattern on the one of the top and bottom surfaces, and wherein the first prism pattern crosses the second prism pattern.

20. The backlight unit according to claim 19, wherein the light guide plate further includes a diffusion pattern on the other of the top and bottom surfaces.

21. A display device, comprising:

a display panel;

a light guide plate facing the display panel and including a first prism pattern on one of top and bottom surfaces;

a lamp including at least a first lamp portion and a second lamp portion that face two side surfaces of the light guide plate, respectively; and a reflector facing the bottom surface of the light guide plate, wherein the first prism pattern is formed in an oblique direction of crossing at least one of the first and second lamp portions, wherein the light guide plate further includes a second prism pattern on the one of the top and bottom surfaces, and wherein the first prism pattern crosses the second prism pattern.

22. The device according to claim 21, wherein the light guide plate further includes a diffusion pattern on the other of the top and bottom surfaces.

23. A backlight unit for a display device, comprising:

a light guide plate including first and second prism patterns on one of top and bottom surfaces;

a lamp including at least a first lamp portion and a second lamp portion that face first and second side surfaces of the light guide plate, respectively; and a reflector facing the bottom surface of the light guide plate, wherein the first prism pattern includes a plurality of furrows formed along an oblique first direction of crossing at least one of the first and second lamp portions and the second prism pattern includes a plurality of furrows formed along a second direction of crossing the first direction.

* * * * *